United States Patent
Yang et al.

(10) Patent No.: US 11,475,156 B2
(45) Date of Patent: Oct. 18, 2022

(54) DYNAMICALLY ADJUSTED TIMEOUT QUARANTINED CODE SCANNING

(71) Applicant: International Business Machines Corporation, Armonk, NY (US)

(72) Inventors: Dan Yang, Cary, NC (US); Xianjun Zhu, Cary, NC (US); Pu Yang, Cary, NC (US); Bo Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/813,899

(22) Filed: Mar. 10, 2020

(65) Prior Publication Data
US 2021/0286895 A1 Sep. 16, 2021

(51) Int. Cl.
| | |
|---|---|
| G06F 21/62 | (2013.01) |
| G06F 21/56 | (2013.01) |
| G06F 21/57 | (2013.01) |
| G06F 16/188 | (2019.01) |
| G06Q 50/26 | (2012.01) |

(52) U.S. Cl.
CPC ........ G06F 21/6245 (2013.01); G06F 16/188 (2019.01); G06F 21/563 (2013.01); G06F 21/577 (2013.01); G06F 2221/033 (2013.01); G06Q 50/265 (2013.01)

(58) Field of Classification Search
CPC .. G06F 21/6245; G06F 16/188; G06F 21/563; G06F 21/577; G06F 2221/033; G06Q 50/265
USPC .......................................................... 726/23
See application file for complete search history.

(56) References Cited

U.S. PATENT DOCUMENTS

| | | |
|---|---|---|
| 6,393,484 B1 | 5/2002 | Massarani |
| 7,716,743 B2 | 5/2010 | Costea |
| 8,819,772 B2 * | 8/2014 | Bettini .................... H04L 67/34 726/1 |
| 8,918,867 B1 | 12/2014 | Salour |
| 2006/0085850 A1 | 4/2006 | Mayfield |
| 2006/0173704 A1 * | 8/2006 | Hair, III .................. G06F 1/266 713/300 |

(Continued)

OTHER PUBLICATIONS

Cimpanu, Catalin, "Support Ends Today Windows Windows 7 end of life: Security risks and what you should do next", Mar. 21, 2019, 18 pages, <https://www.zdnet.com/article/over-100000-github-repos-have-leaked-api-or-cryptographic-keys/>.

(Continued)

*Primary Examiner* — Bryan F Wright
(74) *Attorney, Agent, or Firm* — Randy E. Tejeda

(57) ABSTRACT

In an approach to quarantining source code to prevent confidential information exposure, one or more computer processors store a pushed codebase associated with a user to an isolated quarantine area, wherein access to the quarantine area is restricted to the user through user interface code visibility enforcement and protocol code visibility enforcement. The one or more computer processors dynamically adjust a timeout period based on codebase complexity, user preferences, associated dependencies, codebase size, minimum execution temporal period for one or more scans, and system specifications. The one or more computer processors responsive to identifying one or more instances of confidential information, perform one or more remedial actions.

20 Claims, 4 Drawing Sheets

(56) References Cited

U.S. PATENT DOCUMENTS

| | | |
|---|---|---|
| 2007/0198525 A1 | 8/2007 | Chatterjee |
| 2013/0152154 A1* | 6/2013 | Xiao ................. G06F 17/00 726/1 |
| 2015/0040229 A1 | 2/2015 | Chan |
| 2019/0155722 A1* | 5/2019 | Gupta ................. G06F 11/302 |

OTHER PUBLICATIONS

Kim et al. "A Hybrid Static Tool to Increase the Usability and Scalability of Dynamic Detection of Malware," 2018 13th International Conference on Malicious and Unwanted Software: "Know Your Enemy" (MALWARE), © 2018 IEEE, 9 pages.

Palma, Bernardo, "Byzantine Fault Tolerant Monitoring of Distributed Systems" (extended abstract of the MSc dissertation), Printed Jan. 14, 2020, 10 pages.

* cited by examiner

DYNAMICALLY ADJUSTED TIMEOUT QUARANTINED CODE SCANNING

BACKGROUND

The present invention relates generally to the field of software configuration management, and more particularly to quarantining source code to prevent confidential information exposure.

Software configuration management, version control, also known as revision control or source control, is the management of changes to documents, computer programs, applications, software, and other collections of information. Changes are usually identified by a number or letter code, termed the "revision number", "revision level", or simply "revision". For example, an initial set of files is "revision 1". When the first change is made, the resulting set is "revision 2", and so on. Each revision is associated with a timestamp and the person making the change. Revisions can be compared, restored, and with some types of files, merged.

Version control systems (VCS) commonly run as standalone applications, but revision control is also embedded in various types of software such as word processors and spreadsheets, collaborative web docs and in various content management systems. Revision control allows for the ability to revert a document to a previous revision, which is critical for allowing editors to track edits, correct mistakes, and defend against confidential information exposure.

SUMMARY

Embodiments of the present invention disclose a computer-implemented method, a computer program product, and a system for quarantining source code to prevent confidential information exposure. The computer-implemented method includes one or more computer processors storing a pushed codebase associated with a user to an isolated quarantine area, wherein access to the quarantine area is restricted to the user through user interface code visibility enforcement and protocol code visibility enforcement. The one or more computer processors dynamically adjust a timeout period based on codebase complexity, user preferences, associated dependencies, codebase size, minimum execution temporal period for one or more scans, and system specifications. The one or more computer processors responsive to identifying one or more instances of confidential information, perform one or more remedial actions.

DETAILED DESCRIPTION

Figure 1:
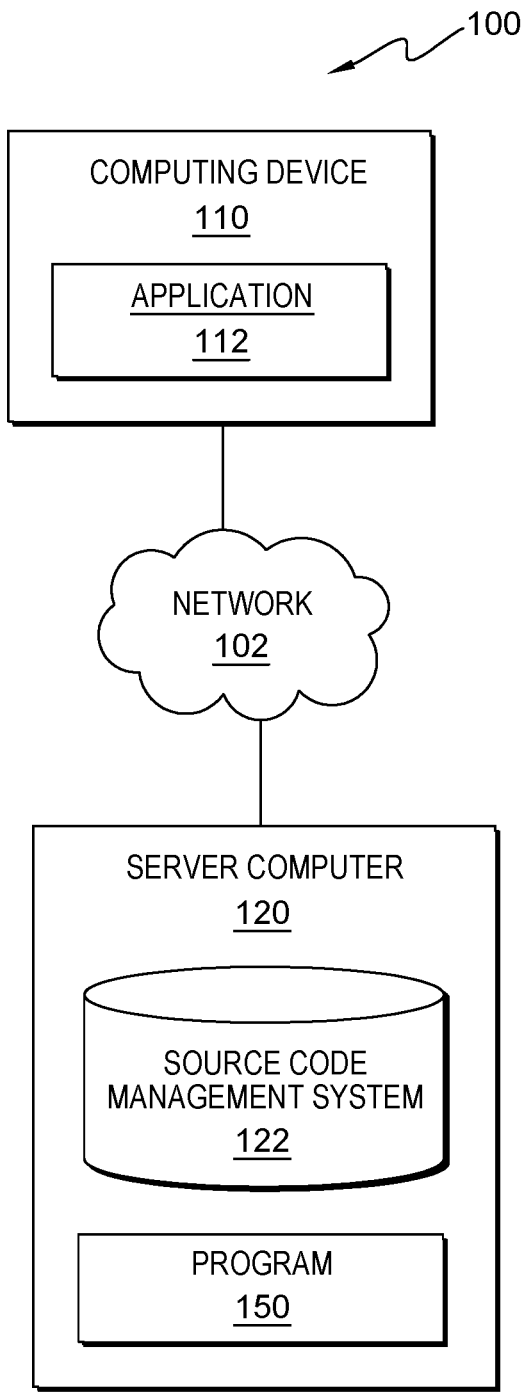
FIG. 1 is a functional block diagram illustrating a distributed data processing environment, in accordance with an embodiment of the present invention.

Current implementations of source code management systems have significant disadvantages with scanning of newly pushed code. Developers may inadvertently include confidential or sensitive information when pushing code to a public code repository such as an open source project. Typically, said implementations utilize the following strategies: local scan before push, server-side scan before publishing, server-side scan after publishing. Local scanning before push requires developers to use a combination of client-side git hook (e.g., pre-commit hook) and secret detection tools to run the scan locally before the code push. The main disadvantage of local scanning before push is that substantial enforcement is required on each repository for each developer in each developer environment. Maintaining such a repository and pushing constant updates to a large organization is a computational significant endeavor, tying up substantial resources. This issue is further intensified when different departmental units require different sets of tools and permissions. Server-side scanning before publishing occurs when the pushed code first reaches a source code management server. Typically, a script is run against the code and a decision is made on whether to accept or reject the code based on an output of the script. Current systems implement a timeout value, for example 5 seconds, without a timeout period, long running script can potentially hang the push process for an extended period of time, but due to this short timeout value, scripts have to comply with a requirement of script brevity, potentially exposing inadvertent confidential information. Server-side scanning after publishing occurs after the code has been accepted by a server. Server-side scanning normally monitors for a push event, responsively clones code, and runs a scan. A disadvantage of server-side scanning is that once confidential information has been found the information may have already been accessed and viewed by unpermitted users.

Embodiments of the present invention conduct security scanning in a quarantine area server-side. Embodiments of the present invention stores pushed code in a quarantine area which is only visible and accessible to an uploading user. Embodiments of the present invention enforces code visibility (i.e., accessibility, pull access, etc.) at a user interface level and protocol level (i.e., git). Embodiments of the present invention conduct a plurality of scans and security checks subject to a dynamic timeout period (i.e., quarantine period). Embodiments of the present invention notify an uploading user with warnings and remedial actions. Embodiments of the present invention publish pushed code responsive to a successful (e.g., no errors or a low (e.g., non-critical, percentage less than 10%, etc.) generated risk score) scanning. Embodiments of the present invention recognize that server-side security scanning reduces organizational computation requirements as a result of eliminating localized scanning systems. Embodiments of the present invention recognize that code security is increased due to security centralization allowing for consistent and unbiased security enforcement. Embodiments of the present invention recognize that code and system security is increased through limiting code visibility in a quarantine area, preventing pushed code from being exposed to the public before it successfully passing one or more scans and checks. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In the depicted embodiment, computing device 110 contains application 112.

Application 112 is representative of a set of one or more programs designed to carry out the operations for a specific application to assist a user to perform an activity (e.g., word processing programs, spread sheet programs, media players, web browsers). In the depicted embodiment, applications 112 is a set of one or more programs designed to assist in software code management and orchestration. Application 112 allows a user to view all assigned code (i.e., public and permitted private code), push new code, pull existing code (i.e., private or public), remove code, and modify code. In an embodiment, application 112 provides a web graphical interface, allowing one or more users to access and manage the system. In another embodiment, application 112 provides an application programming interface (API) for creating, running, and modifying one or more codebases. In the depicted embodiment, application 112 resides on computing device 110. In another embodiment, application 112 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes source code management system 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 4.

Source code management system 122 is a repository for data used by program 150. In the depicted embodiment, source code management system 122 resides on server computer 120. In another embodiment, source code management system 122 may reside on computing device 110 or elsewhere within distributed data processing environment 100 provided program 150 has access to source code management system 122. A source code management system is an organized collection of data. Source code management system 122 can be implemented with any type of storage device capable of storing data and configuration files that can be accessed and utilized by program 150, such as a database server, a hard disk drive, or a flash memory. Source code management system 122 allows a plurality of users the ability to push code into the system and allow other users to view and download contained codebases. In an embodiment, source code management system 122 assigns role-based access control (RBAC) to pushed and existing code using user authentication, such as LDAP and Active Directory. For additional security, code pushes are digitally signed to ensure authenticity. In another embodiments, pushed code is are scanned for vulnerabilities and patched accordingly. In an embodiment, source code management system 122 stores data used by program 150, such as historical codebases and associated revisions. In various embodiments, source code management system 122 contains one or more stored images associated with one or more contained codebases.

Program 150 is a program for quarantining source code to prevent confidential information exposure. In various embodiments, program 150 may implement the following steps: storing a pushed codebase associated with a user to an isolated quarantine area, wherein access to the quarantine area is restricted to the user through user interface code visibility enforcement and protocol code visibility enforcement, dynamically adjusting a timeout period based on codebase complexity, user preferences, associated dependencies, codebase size, minimum execution temporal period for one or more scans, and system specifications; responsive to identifying one or more instances of confidential information, performing one or more remedial actions. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 and/or any other computing device (not depicted) within distributed data processing environment 100. Program 150 is depicted and described in further detail with respect to FIG. 2.

The present invention may contain various accessible data sources, such as source code management system 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
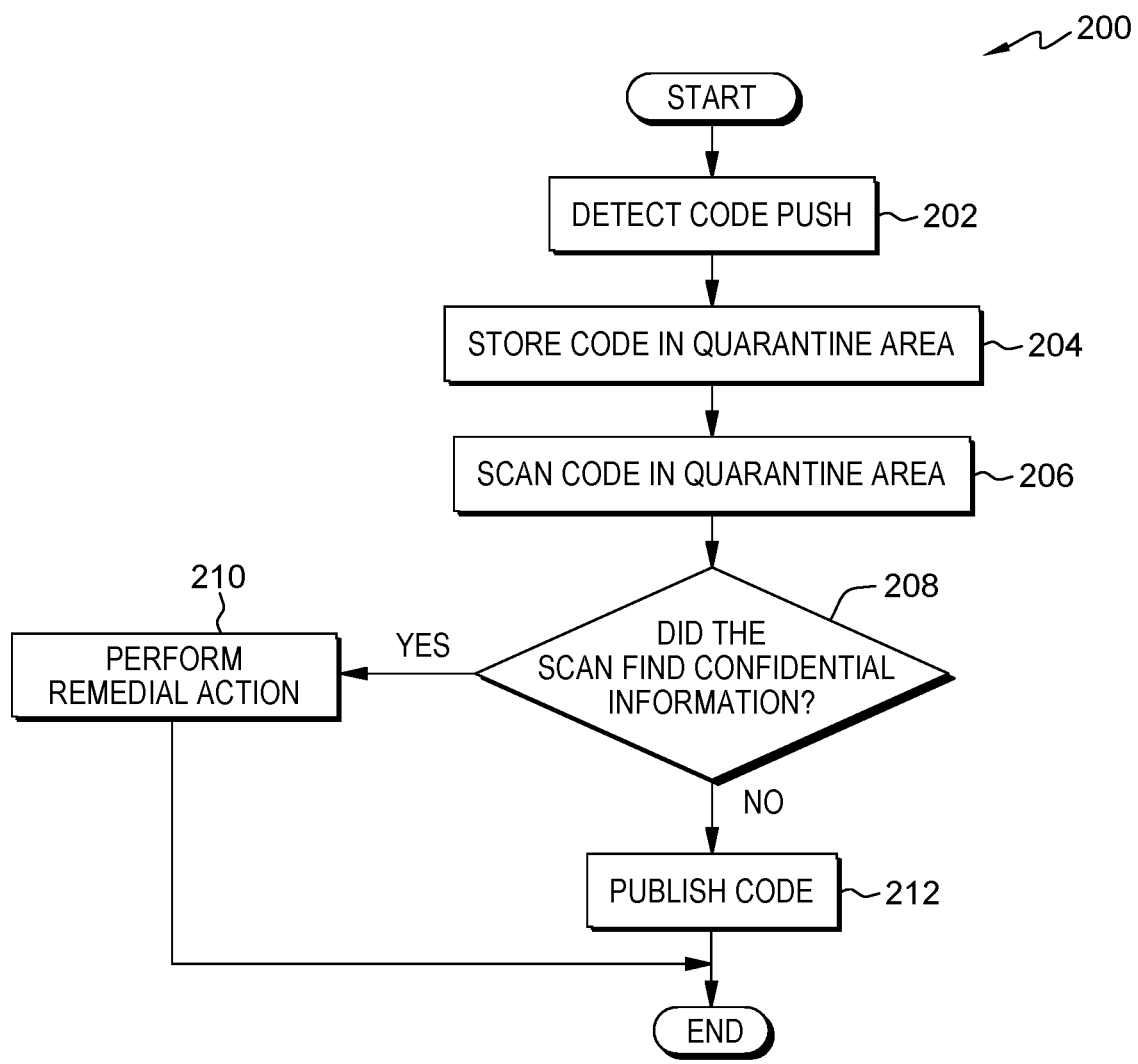
FIG. 2 is a flowchart depicting operational steps of a program, on a server computer within the data processing environment of FIG. 1, for quarantining source code to prevent confidential information exposure, in accordance with an embodiment of the present invention.

FIG. 2 is a flowchart depicting operational steps of program 150 for quarantining source code to prevent confidential information exposure, in accordance with an embodiment of the present invention.

Program 150 detects code push (step 202). Program 150 monitors source code management system 122 or is notified by source code management system 122 when a user pushes a set of code (e.g., codebase) or when a user modifies a codebase stored within source code management system 122. In various embodiments, program 150 acts as an inline proxy and/or a transparent proxy 'sitting' in between computing device (i.e., computing device 110) and the destination server (i.e., source code management system 122). In this embodiment, all network traffic to and from computing device 110 and source code management system 122 will travel through and catalogued by program 150. In another embodiment, program 150 monitors application (i.e., application 112) activity (e.g., git client) to determine a network request (e.g., code push or code modification) representing pushing or pulling code from source code management system 122. In an embodiment, program 150 identifies a pushed or pulled codebase and pauses, delays, or halts the git action (i.e., push or pull). In various embodiments, program 150 receives a notification, along with associated information (e.g., user information, associated permissions, git metadata, etc.), regarding a pushed, stored, or pulled codebase. In an embodiment, program 150 transmits a request (e.g., command, etc.) to a plurality of platform-as-a-service products and source code management/orchestration applications, known in the art, to return or output a list of all accessible codebases. In an embodiment, program 150, automatically, quarantines and scans all codebases contained, referenced, or stored within source code management system 122.

In an embodiment, program 150 dictates code visibility by establishing and maintaining a set of special commands enforcing and controlling code visibility (i.e., code stored in the quarantine area). In this embodiment, program 150 adds a special prefix for code in the quarantine area. For example, user1 pushes a codebase into a quarantine area, the remote ref becomes 'refs/quarantine/user1/feat_branch'. Here, unpermitted users still be able to pull code by directly specifying a branch name, thus program 150 maintains code visibility control through enforcing and permitting only an uploading user, for example, only 'user1' will be able to view the quarantined branch under 'refs/quarantine/user1/*'. In an embodiment, once the detected push (i.e., associated stored codebase) has exited (i.e., transferred to a public area or storage) the quarantine area, the hidden branch 'refs/quarantine/user1/feat_branch' is removed. In this embodiment, program 150 utilizes one or more hidden branches to maintain access where permitted users can pull from a quarantined code while unpermitted users pull from public code. In an embodiment, program 150 redirects unpermitted users, pulling a quarantined codebase, to a public codebase. In various embodiments, program 150 implements control on pull requests, for example 'refs/pull/38/head' represents references for pull request number 38, readable, but not writable. In an embodiment, program 150 maintains all commit hashes contained in a push. Responsive to a pull command, program 150 matches against the hash list, preventing all unpermitted users from obtaining commit hashes from pushed code in quarantine area. This embodiment prevents unpermitted users that obtained quarantined commit hashes, from unauthorized actions.

Program 150 stores code in quarantine area (step 204). Program 150 creates, establishes, and maintains an isolated and private (e.g., accessible to a permitted user, non-public, etc.) quarantine area (e.g., region, container, partition, etc.). The quarantine area is accessible (e.g., quarantined codebases can be pulled by a permitted user utilizing a latest tag or a specialized quarantined tag) by one or more permitted users but cannot be accessed by unpermitted users and the general public. In an embodiment, program 150 enforces code visibility permissions at a user interface level. For example, program 150 prevents a git client or a web graphical interface from presenting, displaying, accesses, and/or provide web code that contains unpermitted codebases. In an embodiment, program 150 enforces code visibility permissions at a protocol level (e.g., git, application programming interfaces (APIs), etc.). For example, program 150 monitors git traffic and git clients to manage one or more git requests to source code management system 122. In an embodiment, code and codebases stored in the quarantined area are prevented, by program 150, from entering public areas and/or from being implemented or merged into one or more branches (e.g., master, etc.). In this embodiment, program 150 prevents unpermitted users from pulling (e.g., downloading, cloning, etc.) restricted quarantined codebases and associated information/metadata.

In an embodiment, program 150 creates the quarantine area as a separate (e.g., isolated) virtual machine (VM). In another embodiment, the quarantine area is a sandbox that isolates untested code from the production environment or repository. In an embodiment, program 150 maintains at least a minimal functionality needed to accurately test a pushed codebase (e.g. production style environment variables, database access, performance constraints (e.g., system specifications). In an embodiment, program 150 creates a virtual filesystem (VFS) based on the codebase pushed in step 202. In an embodiment, program 150 utilizes the one or more sets of filesystem structure information to construct one or more virtual filesystems (VFSs) representing the filesystems of a containerized representation of the codebase and associated testing tools and dependencies. Program 150 utilizes the created VFS as an abstraction of the filesystem of the container. In this embodiment, program 150 stores the codebase, as pushed by a user, and constructs a VFS of the codebase. Program 150 conducts one or more scans and tests on the created VFS.

Responsive to program 150 storing a pushed codebase into the quarantine area, program 150 determines a time-out quarantine period (e.g., temporal range), where the period corresponds to a threshold. In an embodiment, program 150 utilizes the threshold as a failure condition, where any codebase requiring that a scanning time (i.e., time required to complete all pending scans and tests) exceeding the threshold automatically fails and a user is notified, as described in step 210. For example, if the threshold is 15 minutes, then program 150 fails any pushed codebase that exceeds the 15-minute threshold. In an embodiment, program 150 receives an input from a user dictating the threshold value. In various embodiments, program 150 dynamically adjusts said threshold and/or the time-out quarantine period based on at least one of the following parameters: codebase complexity, user preferences, associated dependencies, codebase size, minimum execution temporal period for one or more tests, scans, security advisories (e.g., notice of increased exploitation or attacks relevant to pushed code (e.g., retrieved from one or more cybersecurity organizations)), and considerations for system specifications (e.g., system performance).

Program 150 scans code in quarantine area (step 206). Responsive to program 150 storing code and/or one or more codebases within a quarantine area, program 150 then scans the stored and quarantined codebase for confidential information. In an embodiment, program 150 scans a quarantined (e.g., stored within a quarantine area) codebase for one or more instances of confidential information. In various embodiments, program 150 only scans the code in the created VFS form, allowing program 150 to modify code without impacting the originally pushed code. In an embodiment, confidential information includes one or more of the following: API keys, database connection strings, IP addresses, certificates, encryption keys, Oauth tokens, certificates, privacy enhanced mail (PEM) files, passwords, personal data, environment variables, and passphrases. In various embodiments, a user inputs a list or a set of custom confidential information specific to one or more organizational requirements. In an embodiment, program 150 utilizes approximate string matching (e.g., fuzzy searching). In another embodiment, program 150 creates, trains, and utilizes one or more deep learning models that input one or more code snippets and/or codebases and provides a confidence value (e.g., numerical or probability) that the inputted code snippets contain one or more instances of confidential information. In this embodiment, the one or more deep learning models are neural networks, in particular recurrent neural networks. In a further embodiment, program 150 utilizes said model to generate a risk value or damage score representing potential consequences (e.g., reputational, monetary, security, etc.) of publishing the code without remedial action (e.g., obfuscation, removal, etc.). For example, program 150 calculates a low risk score (e.g., not hazardous, safe, few potential ramifications, etc.) if a user publishes a codebase containing an instance of confidential information pertaining to inaccessible (e.g., not public) developmental environment.

In various embodiments, program 150 scans (e.g., detects) a codebase for security vulnerabilities contained in the code or within dependencies. For example, program 150 utilizes static application security testing tools (SAST) that scan millions of lines of code to automatically identify critical vulnerabilities, such as buffer overflows, structured query language (SQL) injection, cross-site scripting, etc. In an embodiment, program 150 identifies and retrieves information and solutions for one or more detected security vulnerabilities present in one or more codebases.

Accordingly, program 150 identifies one or more instances of confidential information and security vulnerabilities contained in one or more codebases stored in a quarantined area utilizing one or more performed scans and tests.

If program 150 detect confidential information, then program 150 performs a remedial action. ("yes" branch, decision block 208). Program 150 performs a remedial action (step 210). Program 150 performs one or more remedial actions based on the identified confidential information and vulnerabilities. In an embodiment, program 150 prompts a user to select a remedial action. In another embodiments, program 150, automatically, initiates one or more remedial actions based on a generated risk score of the identified instances of confidential information. For example, if a generated risk score does not exceed a predetermined risk threshold, then program 150 initiates one or more remedial actions without user interaction. In a further embodiment, program 150 recommends one or more adjustments to code with vulnerability patches or fixes. In this embodiment, program 150 adjusts the file structure of the created VFS while retaining the original pushed code. For example, program 150 reports that an unpatched codebase is subject to a plurality of database vulnerabilities. In an embodiment, program 150 patches the code with respective software vulnerability patches or fixes based on the identified contained software.

In another embodiment, program 150 obfuscates identified confidential information so that when publicly viewed the confidential information comprises unintelligible text. In various embodiments, program 150 encrypts confidential information, replacing confidential information with a hash or cypher. This embodiment allows confidential information to be stored on public codebases without any code modification and viewable to permitted users or users that have an associated key (e.g., decryption). In an embodiment, program 150 replaces (e.g., substitutes) one or more instances of confidential information with one or more pointers, links, and/or placeholders. In a further embodiment, program 150 maintains a module (e.g., repository) containing secure storage of confidential information necessary for a continuous deployment of a quarantined codebase, allowing public deployment of code without exposing confidential information and eliminating a need to provide production values (i.e., confidential information specific for deployment). In various embodiments, program 150 injects (e.g., replaces, adds, substitutes, etc.) confidential information into one or more placeholders during deployment. In this embodiment, pointers link to one or more secure (e.g., contained in a secure repository, server, etc.) environmental files and associated variables that contain one or more sets of confidential information.

In an embodiment, program 150 may notify, push, and/or transmit (e.g., send) one or more notifications to one or more computing devices (not depicted) associated a user or one or more administrators, utilizing a plurality of communication and transmission methods including, but not limited to, short message service (SMS), email, push notification, automated phone call, text-to-speech, git client warning, etc. In an embodiment, program 150 transmits data containing at least one of the following; identified confidential information, identified security vulnerabilities, associated code snippets (e.g., a section of code containing an exposed database connection string), and associated remedial actions, as described below. In various embodiments, program 150 suspends activity (e.g., retains code in the quarantine area) until a response is received from a permitted user. In these embodiments, program 150 prevents any unpermitted users from viewing, accessing, or downloading said code. In another embodiment, program 150 deletes and removes quarantined codebases that program 150 does not receive a user response. In this embodiment, program 150 specifies a response threshold that sets a temporal period for a user response. In various embodiments, program 150 transmits a generated report, as detailed below.

In an embodiment, program 150 generates a report containing scan and testing results (i.e., identified confidential information, identified security vulnerabilities, remedial actions, generated risk scores, etc.), as described in step 206. In various embodiments, program 150 constructs a document (e.g., downloadable document, spreadsheet, image, graph, etc.) containing the generated report. In this embodiment, the document is a digital or physical document (e.g., printed). In another embodiment, program 150 creates a visual representation the report, allowing a user to interact, add, modify, and/or remove one or more scans and/or tests. In yet another embodiment, program 150 presents one or more scanning and testing results on a graphical user interface (not depicted) or a web graphical user interface (e.g., generates hypertext markup language contained the generated results). Program 150 may output scanning and testing results into a plurality of suitable formats such as text files, HTML files, CSS files, JavaScript files, documents, spreadsheets, etc.

In the above embodiments, program 150 may generate, adjust, modify, transform, and/or present the appearance of a plurality of stylistic elements of the reports, generated web code, and notifications. In an embodiment, said plurality may include; adjustments to font, font size, character style (e.g., bold, italics, font color, background color, superscript, subscript, capitalization, etc.), transparency, etc. For example, program 150 applies a "bold" adjustment to a section of code that contains confidential information. In another example, program 150 adjusts cleared sections of code with a greater transparency compared to sections of code that have detected issues. In various embodiments, program 150 adjusts one or more stylistics elements based on one or more scanning and testing results.

If program 150 does not detect confidential information, then program 150 publishes the code ("no" branch, decision block 208). Program 150 publishes the code (step 212). Program 150 pushes, transmits, and/or stores the quarantined code into a public area where the code can be publicly viewed and downloaded. In an embodiment, program 150, automatically, deploys a containerized variation of the code to another host or cluster of hosts.

Figure 3:
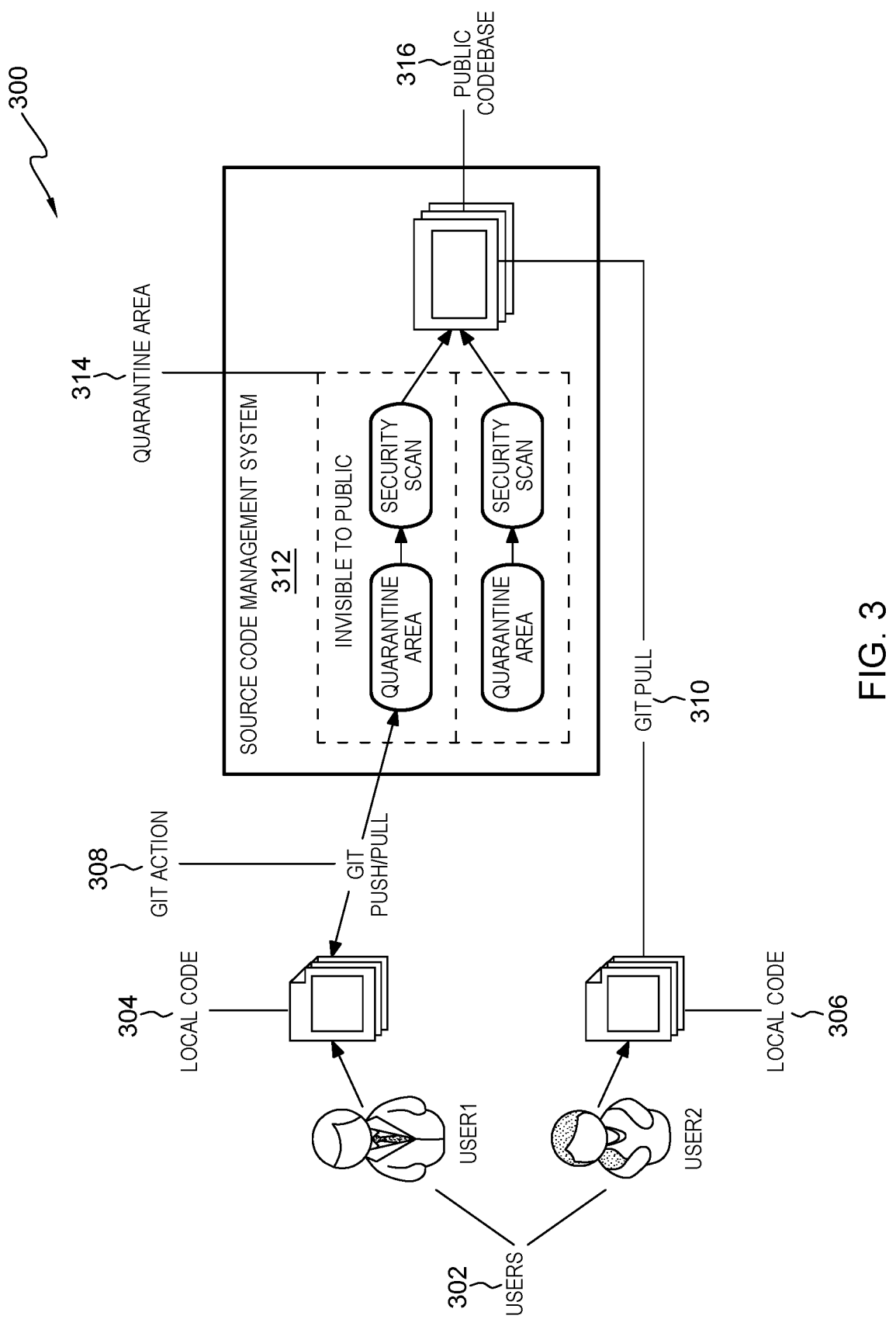
FIG. 3 illustrates operational steps of a program within the data processing environment of FIG. 1, in accordance with an embodiment of the present invention.

FIG. 3 depicts example 300, in accordance with an illustrative embodiment of the present invent. User 302 contains, user1 and user2 where each user has a local git repository, respectively, local code 304 and local code 306 contained within respective local workstations. User1 utilizes git action 308, representative of a git push or pull command, to push local code 304 to a source code management system 312. Responsive to the push, program 150 stores the pushed code in quarantine area 314, a private and isolated area contained within source code management system 312 and initiates one or more security scans. Responsive to the scan completion, program 150 determines whether the code is defective (e.g., exceeds a defect threshold, code contains sensitive information, etc.). If program 150 determines that the code does not have defects, then program publishes (e.g., allows a standard push process) the code to public codebase 316, which represents publicly viewable code. If program 150 determines that the code has defects, then program 150 sends a notification to user1. If the pushed code of user1 is in a quarantine area and under security scan, when user1 initiates git action 308 to pull the latest code of user1, the code will be pulled from the codebase contained within quarantine area 314. If the latest code of user1 is stored within quarantine area 314 when user2 (i.e., unpermitted user) initiates git pull 310 and attempts to pull the latest code of user1, the code is pulled and returned from public codebase 316.

Figure 4:
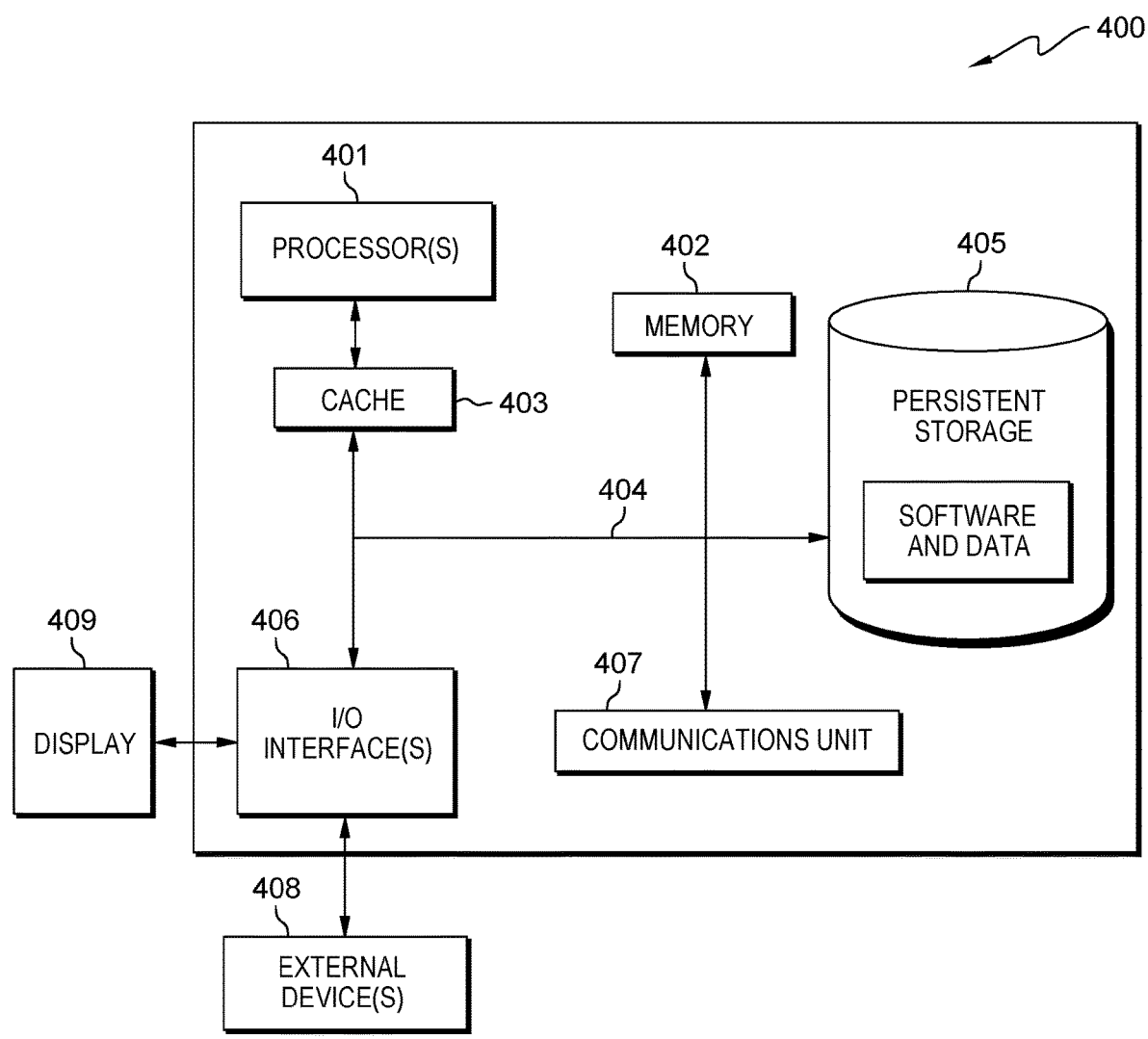
FIG. 4 is a block diagram of components of computing device and server computer, in accordance with an embodiment of the present invention.

FIG. 4 depicts a block diagram of components of computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected, respectively, to computing device 110 and server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    storing, by one or more computer processors, a pushed codebase associated with a user to an isolated quarantine area, wherein access to the quarantine area is restricted to the user through user interface code visibility enforcement and protocol code visibility enforcement;
    dynamically adjusting, by one or more computer processors, a timeout period based on codebase complexity, user preferences, associated dependencies, codebase size, minimum execution temporal period for one or more scans, system specifications, and notices of increased exploitation related to the pushed code;
    responsive to the pushed codebase exceeding the dynamically adjusted timeout period, failing, by one or more computer processors, the pushed codebase and notifying the user; and
    responsive to identifying one or more instances of confidential information, performing, by one or more computer processors, one or more remedial actions.

2. The method of claim 1, wherein identifying one or more instances of confidential information contained in the stored codebase within the timeout period, comprises:
    creating, by one or more computer processors, a virtual filesystem containing a containerized representation of the stored codebase; and
    performing, by one or more computer processors, one or more server-side scans on the created virtual filesystem.

3. The method of claim 1, wherein the confidential information represents API keys, database connection strings, IP addresses, certificates, encryption keys, Oauth tokens, PEM files, passwords, personal data, environment variables, and passphrases.

4. The method of claim 1, wherein responsive to identifying the one or more instances of confidential information, performing the one or more remedial actions, comprises:
    sending, by one or more computer processors, a notification containing scan results containing the identified confidential information, identified security vulnerabilities, remedial actions, and associated generated risk scores.

5. The method of claim 1, further comprising:
    obfuscating, by one or more computer processors, the identified one or more instances of confidential information.

6. The method of claim 1, further comprising:
    generating, by one or more computer processors, a risk value representing consequences of a publicly published stored codebase.

7. The method of claim 1, further comprising:
    encrypting, by one or more computer processors, the identified one or more instances of confidential information.

8. The method of claim 1, wherein the protocol code visibility enforcement, comprises:
    maintaining, by one or more computer processors, a set of protocol level commands enforcing code visibility associated with one or more user permissions.

9. The method of claim 1, where user interface code visibility enforcement, comprises:
    preventing, by one or more computer processors, one or more source code version clients from presenting the stored codebase to one or more unpermitted users.

10. The method of claim 1, further comprising:
    redirecting, by one or more computer processors, unpermitted users pulling the stored codebase to a public codebase.

11. The method of claim 1, further comprising:
    allowing, by one or more computer processors, the user to pull the stored codebase from the quarantine area.

12. A computer program product comprising: one or more computer readable tangible storage device and program instructions stored on the one or more computer readable tangible storage device, the stored program instructions comprising: program instructions to store a pushed codebase associated with a user to an isolated quarantine area, wherein access to the quarantine area is restricted to the user through user interface code visibility enforcement and protocol code visibility enforcement; dynamically adjust a timeout period based on codebase complexity, user preferences, associated dependencies, codebase size, minimum execution temporal period for one or more scans, system specifications, and notices of increased exploitation related to the pushed code;
    program instructions to, responsive to the pushed codebase exceeding the dynamically adjusted timeout period, failing, by one or more computer processors, the pushed codebase and notifying the user; and program instructions to responsive to identifying one or more instances of confidential information, perform one or more remedial actions.

13. The computer program product of claim 12, wherein the confidential information represents API keys, database connection strings, IP addresses, certificates, encryption keys, Oauth tokens, PEM files, passwords, personal data, environment variables, and passphrases.

14. The computer program product of claim 12, wherein the program instructions, stored on the one or more computer readable tangible storage media device, comprise: program instructions to obfuscate the identified one or more instances of confidential information.

15. The computer program product of claim 12, wherein the program instructions, stored on the one or more computer readable tangible storage media device, comprise: program instructions to generate a risk value representing consequences of a publicly published stored codebase.

16. A computer system comprising:
one or more computer processors;
one or more computer readable storage media; and
program instructions stored on the computer readable storage media for execution by at least one of the one or more processors, the stored program instructions comprising:
program instructions to store a pushed codebase associated with a user to an isolated quarantine area, wherein access to the quarantine area is restricted to the user through user interface code visibility enforcement and protocol code visibility enforcement;
program instructions to dynamically adjust a timeout period based on codebase complexity, user preferences, associated dependencies, codebase size, minimum execution temporal period for one or more scans, system specifications, and notices of increased exploitation related to the pushed code;
program instructions to, responsive to the pushed codebase exceeding the dynamically adjusted timeout period, failing, by one or more computer processors, the pushed codebase and notifying the user; and
program instructions to responsive to identifying one or more instances of confidential information, perform one or more remedial actions.

17. The computer system of claim 16, wherein the confidential information represents API keys, database connection strings, IP addresses, certificates, encryption keys, Oauth tokens, PEM files, passwords, personal data, environment variables, and passphrases.

18. The computer system of claim 16, wherein the program instructions, stored on the one or more computer readable storage media, comprise:
program instructions to obfuscate the identified one or more instances of confidential information.

19. The computer system of claim 16, wherein the program instructions stored, on the one or more computer readable storage media, comprise:
program instructions to generate a risk value representing consequences of a publicly published stored codebase.

20. The computer system of claim 16, wherein the program instructions stored, on the one or more computer readable storage media, comprise:
program instructions to redirect unpermitted users pulling the stored codebase to a public codebase.

* * * * *